United States Patent [19]

Schadin et al.

[11] Patent Number: 4,878,983

[45] Date of Patent: Nov. 7, 1989

[54] APPARATUS FOR BUILDING PNEUMATIC TIRE COVERS

[76] Inventors: Lev V. Schadin, ulitsa Avtozavodskaya, 67, kv. 5; Alexander S. Klimov, ulitsa Klubnaya, 4, kv. 32, both of Yaroslavl, U.S.S.R.

[21] Appl. No.: 82,379

[22] Filed: Aug. 6, 1987

[51] Int. Cl.⁴ .............................................. B29D 30/24
[52] U.S. Cl. ..................................... 156/415; 156/417
[58] Field of Search ............... 156/396, 400, 401, 402, 156/407, 414, 415, 416, 417, 418, 419, 420

[56] References Cited

U.S. PATENT DOCUMENTS

| | | | |
|---|---|---|---|
| 3,510,375 | 5/1970 | Batten | 156/415 X |
| 3,645,826 | 2/1972 | Henley et al. | 156/415 X |
| 3,726,742 | 4/1973 | Harris | 156/402 X |
| 3,873,397 | 3/1975 | Leblond et al. | 156/415 X |

FOREIGN PATENT DOCUMENTS 538898 12/1976 U.S.S.R.
1183391 10/1985 U.S.S.R.

Primary Examiner—Michael W. Ball
Assistant Examiner—Geoffrey L. Knable
Attorney, Agent, or Firm—Lilling & Greenspan

[57] ABSTRACT

An apparatus has a main tire-building drum and auxiliary tire-building drums which are mounted coaxially with one another. The main tire-building drum has a rotation drive. The auxiliary tire-building drums are mounted on supports which are connected to drives for their axial movement, have actuators for opening and closing the auxiliary tire-building drums and are operatively connected to the drive of the main tire-building drum. The supports are mounted on fixed guide members. The operative connection between the auxiliary tire-building drums and the drive of the main tire-building drum is so constructed as to transmit rotation to the auxiliary tire-building drums when they are closed.

1 Claim, 2 Drawing Sheets

APPARATUS FOR BUILDING PNEUMATIC TIRE COVERS

BACKGROUND OF THE INVENTION

1. Field of the Invention

The invention relates to the tire manufacture, and in particular, it deals with an apparatus for building covers for pneumatic tires.

The invention may be most advantageously used for layer assembly of large-size and giant tubeless tires with the diameter at rim seat from 25" to 69".

The invention may also be used for layer and combination assembly of truck and special-purpose multiply tires with several bands in the bead, both tube and tubeless.

2. Description of the Prior Art

In view of the present trend towards an increase in production of tubeless tires, especially large-size and giant tires, stringent requirements (first of all, tightness and mileage) are imposed upon their quality.

Known in the art is an apparatus for building pneumatic tire covers comprising a main tire-building drum and auxiliary tire-building drums which are mounted coaxially with one another. The auxiliary tire-building drums are mounted on supports having guide members. The apparatus comprises bead forming mechanisms, rotation drives for the main tire-building drum and for axial movement of the supports, and retainers. Each retainer comprises a pad made of an adhesive material and received in annular grooves and holes in the end face of each auxiliary drum on the side thereof facing the main tire-building drum (SU, A, 538898).

The above-described apparatus are deficient in that they cannot prevent the main and auxiliary tire-building drums from rotating relative to one another when they rotate together. This is due to the fact that friction forces developing at points of contact between the main and auxiliary tire-building drums owing to the provision of the adhesive retainers featuring frictional behavior are used for coupling the main and auxiliary tire-building drums to ensure their combined rotation. These friction forces cannot completely prevent the main and auxiliary tire-building drums from rotating relative to one another during their combined rotation, especially during the starting period of rotation when the cover parts are stitched since substantial inertia forces develop during this period owing to heavy mass and high speed of rotating parts, especially in building large-size tire covers.

Rotation of the main and auxiliary tire-building drums relative to one another results in a displacement of the material applied the main tire-building drum with respect to the material applied to the auxiliary tire-building drums so that folds and closed air voids are formed; a mechanical damage may occur to the sealing layer during the assembly of tubeless tires thus resulting in a cover defect that cannot be remedied.

The use of the retainers in the form of adhesive pads somewhat improves cohesion between the main and auxiliary drums, but it cannot completely rule out their relative rotation during combined rotation, especially in building large-size tire covers. In addition, in this case, during application of succeeding groups of material layers, when the drums are in contact with the material that has been applied to the main drum beforehand, the adhesive pads have a trend towards sticking to the material of the cover carcass so as to cause its damage when the auxiliary drums are retracted from the main drum.

Most similar to the invention is an apparatus for building pneumatic tire covers, comprising coaxial main and auxiliary tire-building drums. The auxiliary tire-building drums are mounted for rotation on supports which are installed on guide members. The apparatus also has a drive for rotation of the main tire-building drum and actuators for axially moving the supports of the auxiliary tire-building drums and a means for connecting the main tire-building drum to the auxiliary tire-building drum, comprising spring-biased pins rigidly secured to shoulders of the main tire-building drum and grooves provided in the end faces of the auxiliary tire-building drums facing towards the main tire-building drum. When the auxiliary tire-building drums are closed, the spring-biased pins are received in the grooves of the auxiliary tire-building drums (SU, A, 1183391). This construction prevents the main and auxiliary tire-building drums from rotating relative to one another when they rotate together during the assembly of the first groups of plies. However, the use of this apparatus would somewhat lower the tire building speed since the drums should be accurately positioned with respect to one another so that the spring-biased pins of the main tire-building drum could be received in the grooves in the end faces of the auxiliary tire-building drums, and this can only be achieved by a repeated step-by-step rotation of the main tire-building drum, first to bring the pins of the main tire-building drum in registry with the grooves of the first auxiliary tire-building drum, and then with the grooves of the second auxiliary tire-building drum. The final alignment of the pins with the grooves is effected by manually turning the auxiliary tire-building drums. The time spent for these manipulations results in a lower output of the apparatus. In addition, this apparatus cannot provide for a rigid engagement of the main tire-building drum with the auxiliary tire-building drums during the assembly of the second and succeeding groups of cover cord plies since the spring-biased pins of the main tire-building drum are covered with the material of the first group of plies and cannot be received in the grooves of the auxiliary tire-building drums so as to ensure their timed rotation.

SUMMARY OF THE INVENTION

It is an object of the invention to improve quality of building of pneumatic tire covers.

Another object of the invention is to increase the output in building pneumatic tire covers.

Still another object of the invention is to lower the fraction of manual labour in building pneumatic tire covers.

These and other objects are accomplished in an apparatus for building pneumatic tire covers, comprising a main tire-building drum having a rotation drive and auxiliary tire-building drums which are mounted for rotation on supports which are installed on grude members coaxially with the main tire-building drum on either side thereof and which have actuators for opening and closing them and drives for axial movement of the supports. According to the invention, the auxiliary tire-building drums are operatively connected to the rotation drive of the main tire-building drum, the operative connection being provided in such a manner as to transmit rotation to the auxiliary tire-building drums when they are closed.

The apparatus according to the invention ensures a strictly time combined rotation of the main and auxiliary tire-building drums during assembly of all groups of cord plies thereby completely ruling out rotation of the main and auxiliary tire-building drums with respect to one another thus precluding damage to the covers being built and improving quality of building.

The construction of the apparatus makes it possible to lower the fraction of manual labour owing to the elimination of operations aimed at bringing the main and auxiliary tire-building drums in registry to ensure their combined rotation. This, in turn, makes it possible to improve productivity of the apparatus according to the invention.

In accordance with an embodiment of the invention, the operative connection between the auxiliary tire-building drums and the rotation drive of the main tire-building drum comprises a transmission shaft connected by means of a chain transmission to an output shaft of the rotation drive of the main tire-building drum, intermediate shafts with gears mounted on the supports of the auxiliary tire-building drums and connected by means of chain transmissions to the transmission shaft, and tooth rims provided on the auxiliary tire-building drums and meshing with the gears of the intermediate shafts when the auxiliary tire-building drums are closed.

This embodiment of the invention offers the simplest way of transmitting rotation to the auxiliary tire-building drums from the drive of the main tire-building drum.

BRIEF DESCRIPTION OF THE DRAWINGS

Other objects and advantages of the invention will become apparent from the following detailed description of a specific embodiment thereof with reference to the accompanying drawings, in which.

DESCRIPTION OF THE PREFERRED EMBODIMENT

Figure 1:
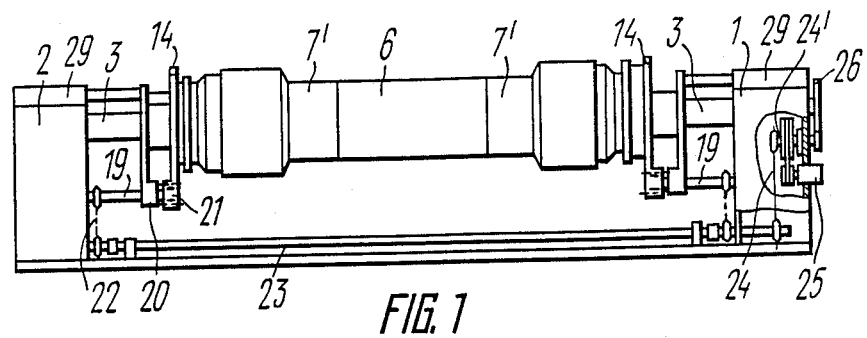
FIG. 1 is a general view of an apparatus according to the invention shown in a position for application and stitching of cord plies.

An apparatus for building tire covers comprises a right-hand bed 1 and a left-hand bed 2 carrying coaxially mounted cylindrical guide members 3 (FIG. 1).

Bead forming mechanisms 4, 5 having pivotal arms 5' and a main tire-building drum 6 (FIGS. 2, 3) are mounted for axial movement on the guide members 3. Supports 7 are mounted on the mechanisms 4, 5 and carry auxiliary tire-building drums 7'. Each auxiliary tire-building drum 7' has a casing 8 carrying rocking arms 9 having sectors 10 pivotally connected thereto.

The casing 8 has axially movable racks 11 engageable with toothed sectors 12 mounted on the arms 9. A ring 13 having a tooth rim 14 is rigidly secured to the racks 11. The ring 13 is connected, by means of a roller 15, to an actuator 16 for opening and closing (i.e expanding and collapsing) the auxiliary tire-building drums 7'.

Bushings 17 with sprockets 18 are mounted for rotation on the beds 1 and 2. Intermediate shafts 19 are axially movable in the bushings 17 and have their free ends which are rotatably received in traverses 20 secured to the supports 7 of the auxiliary tire-building drums 7'.

The shafts 19 have gears 21 engageable with the tooth rims 14 of the rims 13 of the auxiliary tire-building drums 7' when they are closed.

The intermediate shafts 19 are connected, by means of chain transmissions 22, to a transmission shaft 23. The shaft 23 is connected, by means of a chain transmission 24, to an output shaft 24' of a rotation drive 25 of the main tire-building drum 6. In this manner an operative connection is formed between the drive 25 and the auxiliary tire-building drums 7' is ensured.

Figure 4:
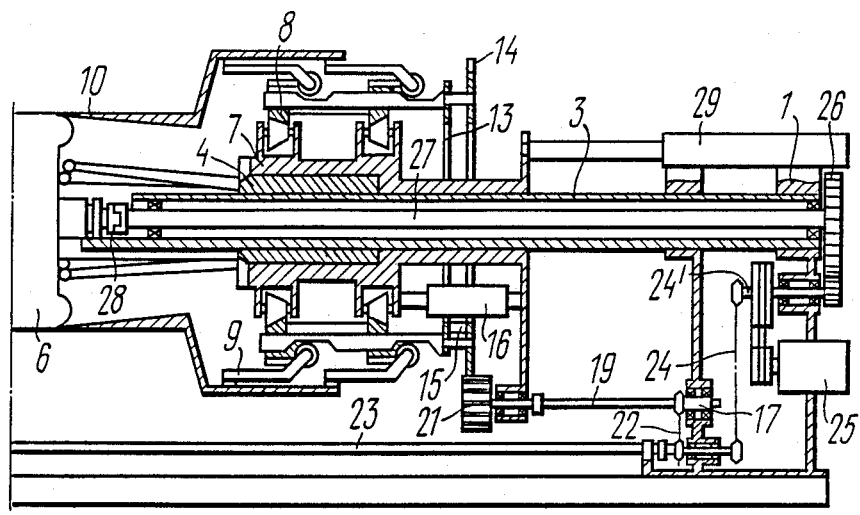
FIG. 4 is a longitudinal sectional view of the right-hand part of the apparatus according to the invention shown in a position for application of plies.

The drive 25 is connected, by means of a gearing 26, to a shaft 27 which extends inside the guide member 3 and which is coupled to the drum 6 by means of a clutch 28 (FIG. 4).

Drives 29 for axial movement of the supports 7 of the auxiliary tire-building drums 7' and mechanisms 4, 5 for forming the bead are mounted on the beds 1 and 2.

Figure 2:
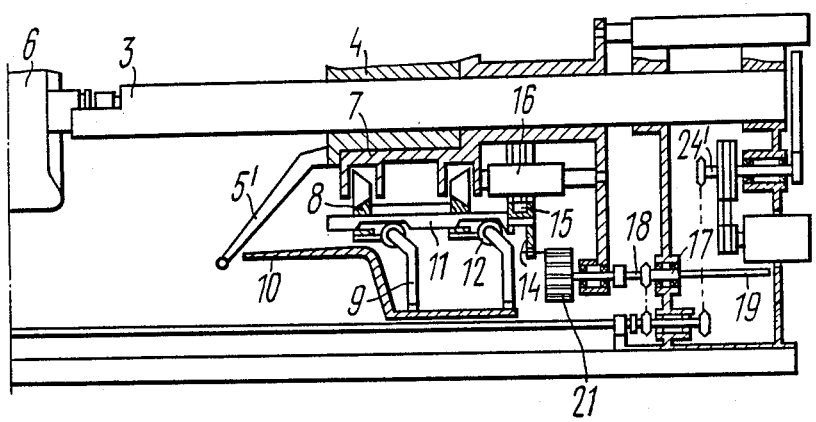
FIG. 2 is a longitudinal sectional view of the right-hand part of the apparatus in the initial position.
Figure 3:
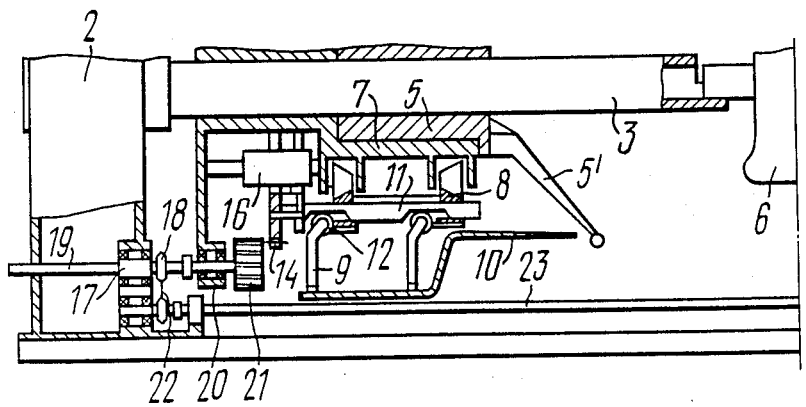
FIG. 3 is a longitudinal sectional view of the left-hand part of the apparatus according to the invention in the initial position.

In the initial position, the auxiliary tire-building drums 7' are open (FIGS. 2, 3). The drive 29 is used to move the bead forming mechanisms 4, 5 with the supports 7 and auxiliary tire-building drums 7' towards the drum 6.

Figure 5:
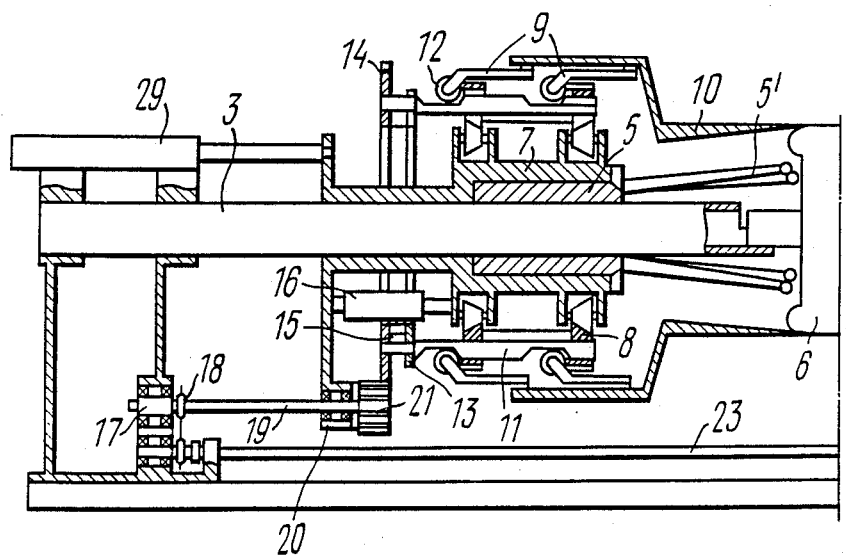
FIG. 5 is a longitudinal sectional view of the left-hand part of the apparatus according to the invention shown in a position for application of plies.

The actuators 16 are turned on to move the rings 13 with the tooth rim 14 and racks 11 in the direction away from the main tire-building drum 6. During movement of the racks 11 the arms 9 will be turned by the tooth sectors 12 in the direction towards the drum 6 so that the sectors 10 of the auxiliary tire-building drums 7' will engage the main tire-building drum 6 (FIGS. 1, 4, 5).

At the end of movement of the rings 13 their tooth rims 14 will come to mesh with the gears 21 mounted on the intermediate shafts 19. A cord ply is applied to the cylindrical surface formed by the drums 6 and 7'.

Then the drive 25 is turned on to transmit its rotation, via the gearing 26, shaft 27 and clutch 28, to the drum 6 and, via the output shaft 24' and chain transmission 24, to the transmission shaft 23 and therefrom, via the chain transmissions 22. to the shafts 19 and to the auxiliary tire-building drums 7' by means of the gears 21 and tooth rims 14 (FIGS. 4, 5, 1), the drums 6 and 7' rotating in a strictly timed manner.

After application and stitching of the first group of cord plies, the bead forming mechanisms 4 and 5 and the supports 7 with the auxiliary drums 7' are retracted back to the initial position by means of the drives 29.

The shafts 19 are axially moved by the traverses 20 in the bushings 17 and are also moved back to the initial position.

When in the initial position, the actuators 16 are turned on to move, by their rollers 15, the rings 13 having the tooth rims 14 and the racks 11 towards the drum 6, the racks 11 engaging the tooth sectors 12 which will turn the arms 9 in the direction away from the drum 6 so that the sectors 10, which are pivotally mounted on the arms 9, will be spaced apart so as to move apart the arms 5' of the bead forming mechanisms 4, 5 for subsequent treatment of the bead. At the end of movement of the rings 13, the tooth rims 14 will disengage from the gears 21, and the operative connection between the drive 25 and auxiliary tire-building drums 7' (FIGS. 2, 3) will be interrupted.

The length of the gears 21 is chosen such that they should engage the tooth rims 14 within a predetermined range of closure of the sectors 10 since the latter should be engageable not only with the drum 6, but also with the material applied thereto to a certain thickness which may be large enough, especially in building multiply and multibead tires.

We claim:

1. An apparatus for building pneumatic tires, comprising:

a main tire-building drum;

guide members having said main tire-building drum mounted thereon;

supports mounted on said guide members;

auxiliary tire-building drums mounted for rotation on said supports coaxially with said main tire-building drum;

a rotation drive for said main tire-building drum;

actuators for collapsing and expanding said auxiliary tire-building drums;

drive means for axially moving said supports and said auxiliary tire-building drums mounted thereon;

a transmission shaft connected with said rotation drive of said main tire-building drum for rotation therewith;

intermediate shafts provided with gears and mounted on said supports of said auxiliary tire-building drums and connected to said transmission shaft for rotation therewith; and tooth rims provided on said auxiliary tire-building drums, said tooth rims being engageable with the gears of said intermediate shafts only when the auxiliary tire-building drums are in the collapsed position such that rotation is only transmitted to said auxiliary tire-building drums from said rotation drive for said main tire-building drum when the auxiliary tire-building drums are in the collapsed position.

* * * * *